US012798072B2

(12) United States Patent
Yang

(10) Patent No.: US 12,798,072 B2
(45) Date of Patent: Nov. 17, 2026

(54) HEAT DISSIPATION STRUCTURE FOR A GRINDING MACHINE

(71) Applicant: BIAU TENG TIGER ENTERPRISE CO., LTD., Mingjian Township, Nantou County (TW)

(72) Inventor: Zhou-Ci Yang, Mingjian Township, Nantou County (TW)

(73) Assignee: BIAU TENG TIGER ENTERPRISE CO., LTD.

( * ) Notice: Subject to any disclaimer, the term of this patent is extended or adjusted under 35 U.S.C. 154(b) by 159 days.

(21) Appl. No.: 18/950,221

(22) Filed: Nov. 18, 2024

(65) Prior Publication Data

US 2026/0027694 A1 Jan. 29, 2026

(30) Foreign Application Priority Data

Jul. 26, 2024 (TW) ................................ 113208001

(51) Int. Cl.
*B25F 5/00* (2006.01)
*B24B 23/02* (2006.01)
(Continued)

(52) U.S. Cl.
CPC .............. *B25F 5/008* (2013.01); *B24B 23/02* (2013.01); *B24B 7/186* (2013.01); *B24B 23/03* (2013.01);
(Continued)

(58) Field of Classification Search
CPC ......... B25F 5/008; B25B 23/02; B25B 23/03; B25B 23/04; B24B 23/02; B24B 41/007;
(Continued)

(56) References Cited

U.S. PATENT DOCUMENTS 12,145,234 B2 * 11/2024 Zhang ....................... B25F 5/02
2015/0151422 A1 * 6/2015 Kuehne .................. B24B 55/10
451/344

(Continued)

FOREIGN PATENT DOCUMENTS

FR 2979844 A3 * 3/2013 ............ B24B 23/04
GB 2420518 A * 5/2006 ............ B24B 47/16

OTHER PUBLICATIONS

English translation of FR2979844 of Mar. 15, 2013.*

*Primary Examiner* — Joel M Attey

(57) ABSTRACT

A heat dissipation and flow guide structure of the grinding machine, which includes: a grinding machine and a counterweight set. The counterweight set is integrally formed with an axial column and has a first counterweight member, a second counterweight member, a third counterweight member and a plurality of the heat sinks. The third counterweight member is larger than the second counterweight member, a height difference is formed between the second and the third counterweight member, and the heat sink is equidistantly formed on the height difference. Accordingly, when the counterweight set is affected by the operation of the driving shaft, it can not only cool down and dissipate heat through the heat sink, but also help solve the problem of high heat generated by the motor and the driving shaft. The gap design also avoids noise and shaking during operation, further improving the safety of the grinding machine.

7 Claims, 9 Drawing Sheets

(51) Int. Cl.

| | |
|---|---|
| *B24B 7/18* | (2006.01) |
| *B24B 23/03* | (2006.01) |
| *B24B 23/04* | (2006.01) |
| *B24B 41/00* | (2006.01) |
| *B24B 41/047* | (2006.01) |
| *B24B 47/12* | (2006.01) |
| *B25B 23/02* | (2006.01) |

(52) U.S. Cl.
CPC ............. *B24B 23/04* (2013.01); *B24B 41/007* (2013.01); *B24B 41/047* (2013.01); *B24B 41/0475* (2013.01); *B24B 47/12* (2013.01); *B25B 23/02* (2013.01)

(58) Field of Classification Search
CPC ... B24B 41/047; B24B 41/0475; B24B 7/186; B24B 47/12
USPC .......................................................... 165/185
See application file for complete search history.

(56) References Cited

U.S. PATENT DOCUMENTS

| | | | | |
|---|---|---|---|---|
| 2015/0258673 | A1* | 9/2015 | Kuehne | B24B 41/007 451/357 |
| 2023/0017671 | A1* | 1/2023 | Zimmerman | B24B 23/03 |
| 2023/0302601 | A1* | 9/2023 | Sugita | B24B 23/005 |
| 2024/0009795 | A1* | 1/2024 | Neuhoff | B24B 55/105 |

* cited by examiner

HEAT DISSIPATION STRUCTURE FOR A GRINDING MACHINE

BACKGROUND OF THE INVENTION

Field of Invention

The present invention relates to a grinding machine, and more particularly to a heat dissipation structure for a grinding machine.

Description of the Related Art

Currently, common machine tools in the industry, such as the grinding machine, etc., all have a main body, and the main body is provided with a motor and a tool shaft driven by the motor. The tool shaft is equipped with the counterweight block to cause the tool shaft to rotate eccentrically, and an actuating part is connected with the counterweight block. Therefore, after the motor is started, it can drive the tool shaft to rotate eccentrically, and the counterweight block drives the actuating part to rotate to process the workpiece. However, when the above-mentioned machine tool is running, the load easily causes the motor to accumulate heat, causing the motor to overheat and affecting whether the machine tool can operate for a long time and also affects the durability of the machine tool.

Therefore, in order to improve the overheating problem of the above-mentioned machine tools, there is a related improvement technology, which is to set a heat sink around the counterweight block. The heat sink has a sleeve part and a plurality of fan blades formed on the outer periphery of the sleeve part. And the heat sink is assembled around the counterweight block through the sleeve part. Accordingly, when the counterweight block is driven by the tool shaft to rotate and conducts high temperature, the heat energy can be guided and discharged through the fan blades of the heat sink to achieve the purpose is to cool down and dissipate heat while improving the smooth operation of the machine tool.

A detailed look at the above-mentioned conventional structure reveals that it still has some shortcomings. The main reasons are as follows: Since the conventional counterweight block is assembled with a heat sink, temperature changes, dimensional errors and other factors create gaps which is easy to cause interference between the heat sink and the counterweight block. The gaps will not only cause the counterweight block to produce noise during rotation, but may even cause the heat sink to shake and detach from the counterweight block due to centrifugal force.

Therefore, it is desirable to provide a heat dissipation structure for a grinding machine to mitigate and/or obviate the aforementioned problems.

SUMMARY OF THE INVENTION

An objective of present invention is to provide a heat dissipation structure for a grinding machine, which is capable of improving the above-mention problems. In order to achieve the above-mentioned objective, a heat dissipation and flow guide structure of the grinding machine, which includes: a grinding machine and a counterweight set. The counterweight set is integrally formed with an axial column and has a first counterweight member, a second counterweight member, a third counterweight member and a plurality of the heat sinks. The third counterweight member is larger than the second counterweight member, a height difference is formed between the second and the third counterweight member, and the heat sink is equidistantly formed on the height difference. Accordingly, when the counterweight set is affected by the operation of the driving shaft, it can not only cool down and dissipate heat through the heat sink, but also help solve the problem of high heat generated by the motor and the driving shaft. The gap design also avoids noise and shaking during operation, further improving the safety of the grinding machine.

Other objects, advantages, and novel features of invention will become more apparent from the following detailed description when taken in conjunction with the accompanying drawings.

DETAILED DESCRIPTION OF PREFERRED EMBODIMENT

Figure 1:
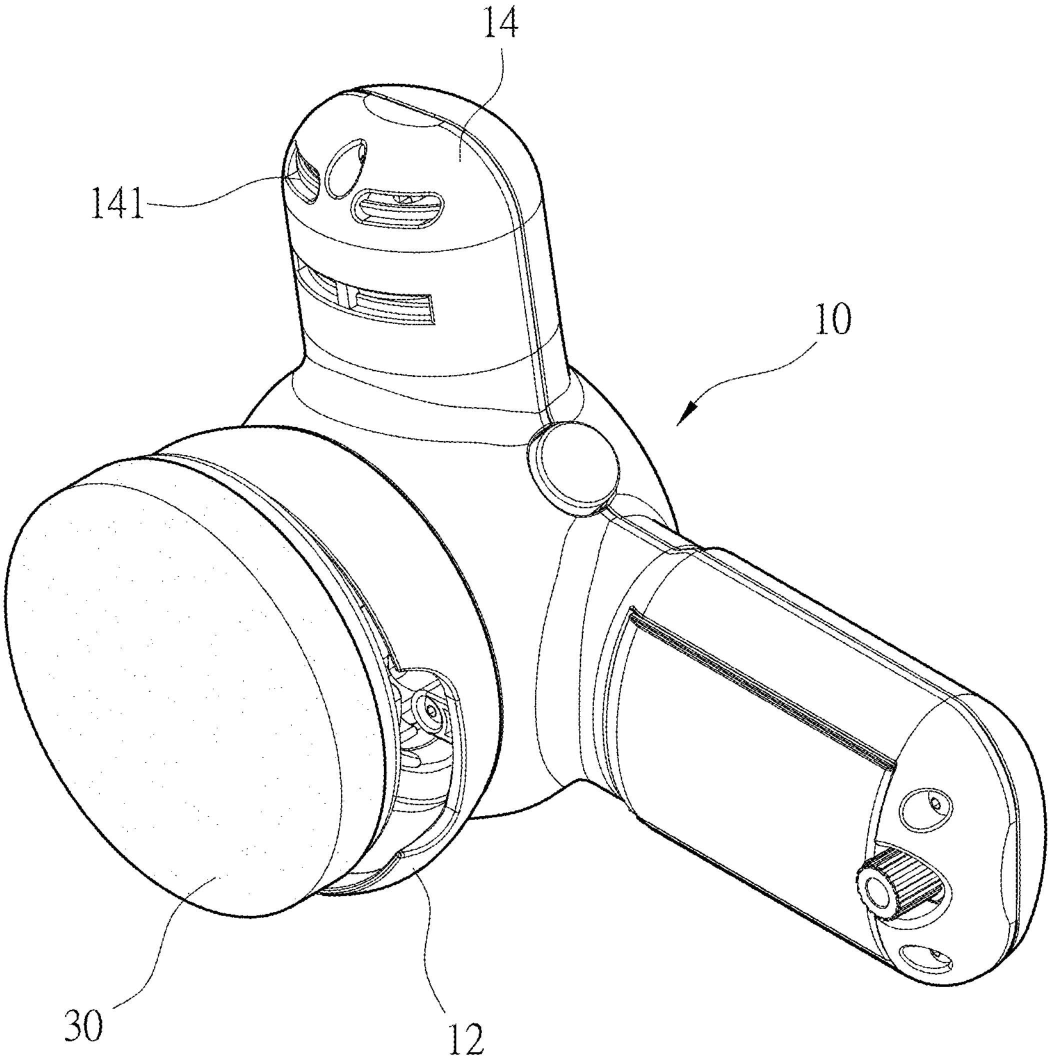
FIG. 1 is a three-dimensional view of a preferred embodiment of the present invention.
Figure 2:
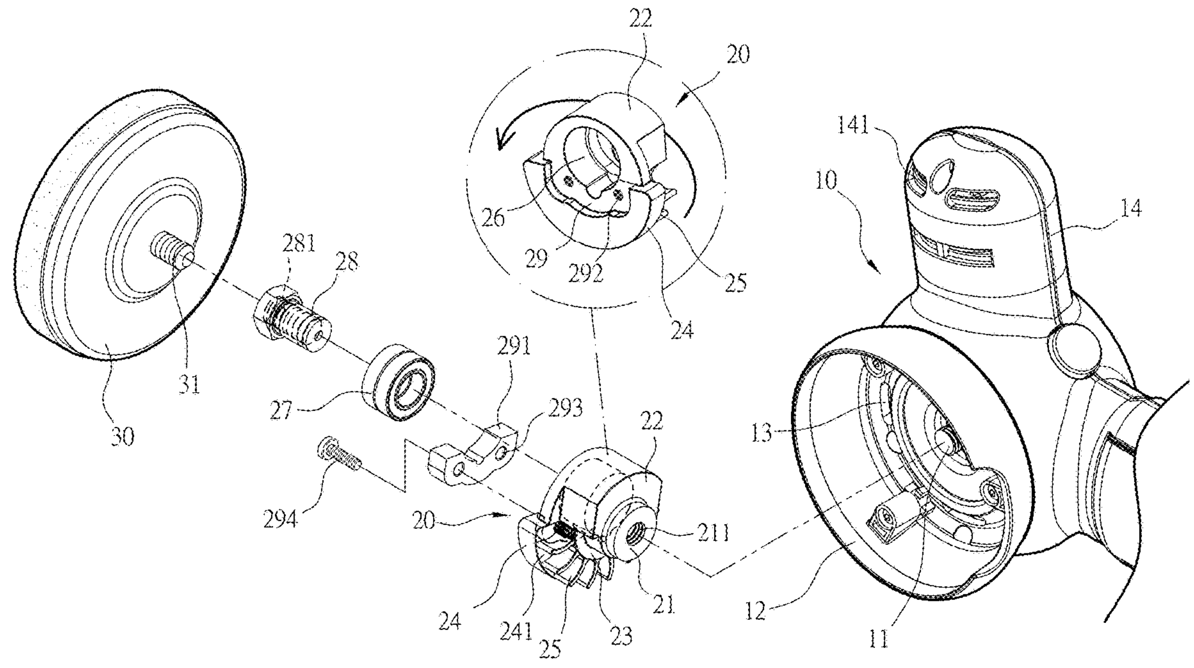
FIG. 2 is an exploded view of the preferred embodiment of the present invention.
Figure 3:
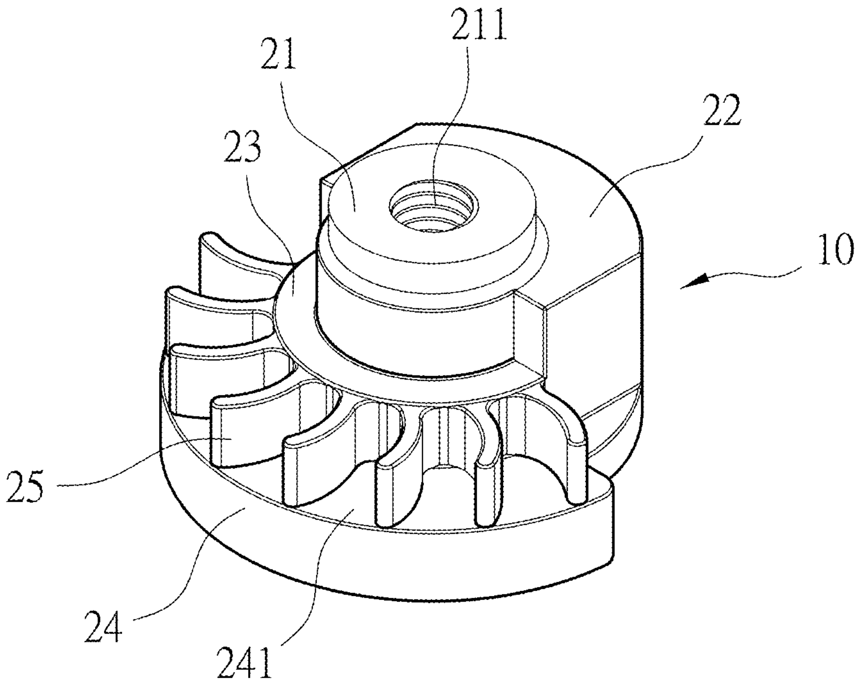
FIG. 3 is a three-dimensional view of the counterweight set of the preferred embodiment of the present invention.
Figure 4:
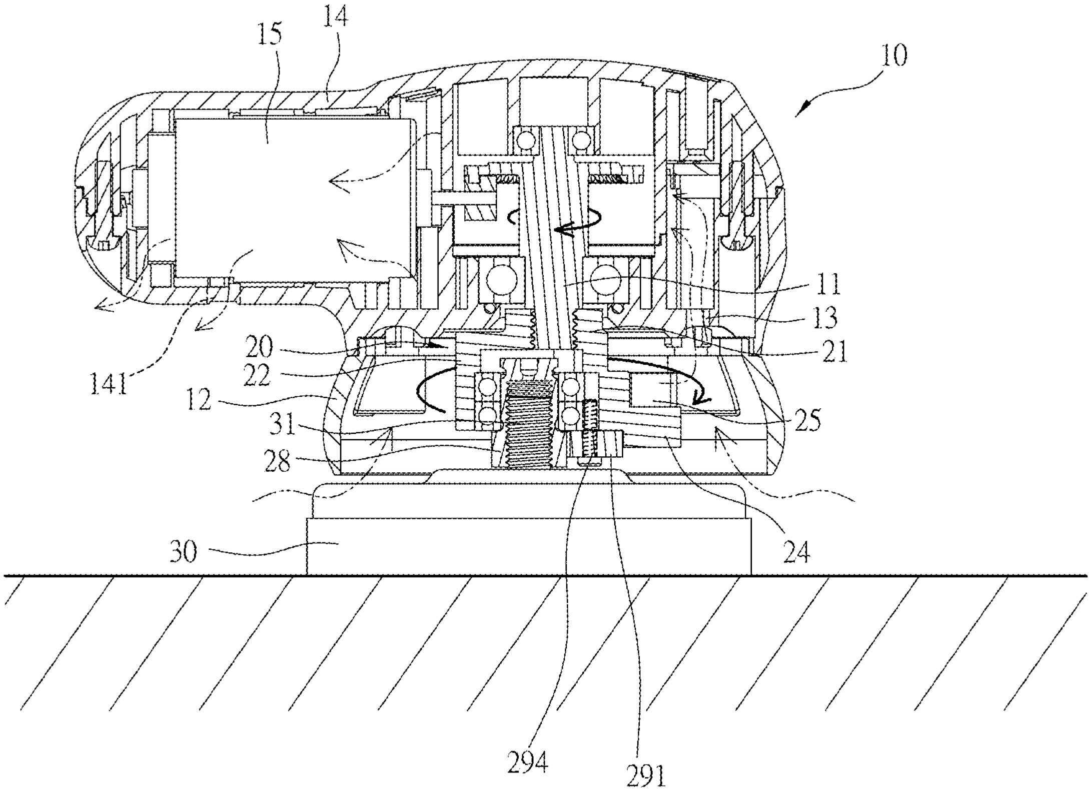
FIG. 4 is a cross-sectional view of the preferred embodiment of the present invention.

First, please refer to FIGS. 1, 2 and 3. A heat dissipation structure for a grinding machine comprises: a grinding machine 10 and a counterweight set 20. The grinding machine 10 has a driving shaft 11 with a ring-shaped cover 12. The grinding machine 10 further comprises a plurality of guiding entrances 13 at a bottom end, a motor box 14 provided at one side for accepting a driving motor 15, and the motor box 14 further comprises a plurality of guiding exits 141. The counterweight set 20 has an axial column 21, a first counterweight member 22, a second counterweight member 23, a third counterweight member 24 and a plurality of heat sinks 25. The axial column 21 further has a connecting screw hole 211 assembled with the driving shaft 11. The first counterweight member 22 is provided at one side of the axial column, the second counterweight member 23 and the third counterweight member 24 are arc-shaped and overlapped on another side of the axial column 21. The second counterweight member 23 is overlapped above the third counterweight member 24, and the third counterweight member 24 is larger than the second counterweight member 23 and a height difference 241 is formed between the second and the third counterweight members 23, 24. The heat sinks 25 are provided around the second counterweight member 23 with heights equal to the height difference 241. The counterweight set 20 further comprises a connecting shaft for connecting to a grinding accessory. Moreover, a bottom end of the counterweight set has an assembly space 26 facing the first counterweight member 22, and the assembly space 26 accepts two bearing members 27. A center of each bearing member 27 and the connecting screw hole 211 are non-concentrically arranged and are connected to a connecting shaft 28 for being assembled with a grinding accessory 30. The connecting shaft 28 further comprising a shaft aperture 281, and the grinding accessory 30 further comprises a center screw 31 assembled with the shaft aperture 281.

Furthermore, the third counterweight member 24 of the counterweight set is larger than the first counterweight member 22, and the first counterweight member 22 is higher than the second and third counterweight members 23, 24, such that the connecting screw hole 211 is closer to the first counterweight member 22. When the counterweight set 20 is connected to the driving shaft 11 for rotation, the counterweight set 20 produces an eccentric rotation stroke relative to the grinding machine 10.

In addition, the bottom end of the counterweight set 20 further comprises a recess 29 between the third counterweight member 24 and the assembly space 26, and the recess 29 correspondingly has at least one counterweight block 291 pair with the grinding accessories 30. Also, the counterweight block 291 is available in multiple weights based on the volume dimensions of the grinding accessory 30. The recess 29 has at least two threaded apertures 292, the counterweight block 291 has at least two through apertures 293 aligned with the two threaded apertures 292, and two bolts 294 are employed to lock the counterweight block 291 onto the recess 29.

The composition and usage of the above-mentioned structure can be seen in FIGS. 2, 3, 4 and 5. The driving shaft 11 of the grinding machine 10 is driven to rotate by the motor 15, and the counterweight set 20 is installed onto on the driving shaft 11 through the connecting screw hole 211, the counterweight set 20 is disposed in the ring-shaped cover 12, and then the grinding accessory 30 is installed with the shaft aperture 281 on the bottom of the counterweight set 20 via the central screw 31. Furthermore, the grinding accessory 30 is installed protruding outside the ring-shaped cover 12. Accordingly, when the motor 15 starts running, because the shaft aperture 281 and the connecting screw hole 211 are not concentrically aligned, and the eccentric design of the counterweight set 20 drives the grinding accessory 30 to perform high-speed and heavy-duty eccentric rotation to further achieve the grinding and polishing purpose via eccentric rotations. Therefore, the motor 15 inside the grinding machine 10 generates a large amount of heat energy and quickly conduct it to the driving shaft 11 and the counterweight set 20. Meantime, the counterweight set 20 rotates and uses the heat sink 25 to generate vortex wind speed and centrifugal force in the ring-shaped cover 12, to attract the air outside of the grinding machine 10 into the ring-shaped cover 12, then the air is introduced into the guiding entrance 13 at the end edge of the grinding machine 10, and the air flows along the internal channel toward the guiding exit 141 of the motor box 14, to bring out the heat energy absorbed by the transmission shaft 11 and the high temperature generated by the motor 15, which achieves the purpose of heat dissipation and cooling of the motor 15, thereby helping to extend the life of the motor 15. Moreover, the water vapor or dust generated by the operation can also be discharged through the heat sink 25 to avoid the damage to the motor and control circuit of the grinding machine 10 caused by the intrusion of water vapor and dust. causes, which helps to improve the durability of the grinding machine 10.

Figure 5:
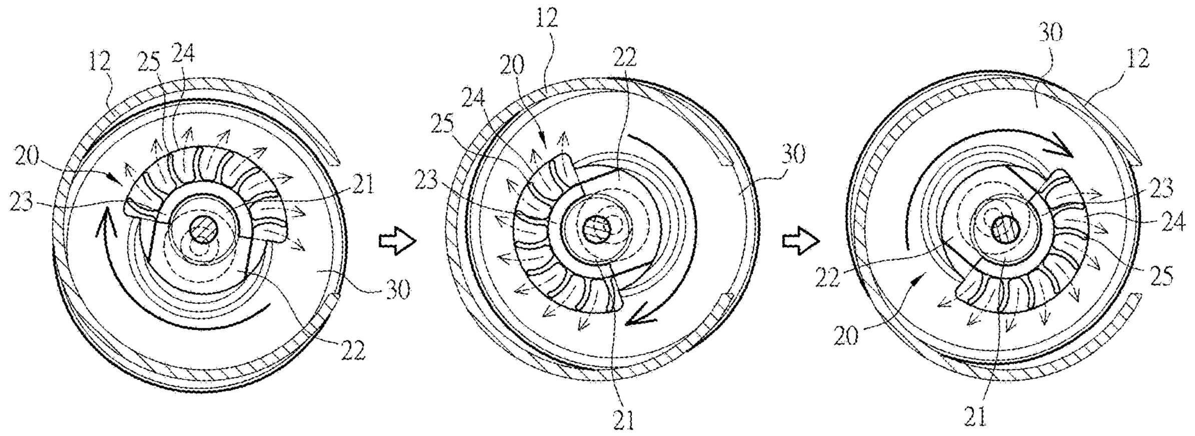
FIG. 5 is a schematic drawing of the counterweight set and the grinding accessory in rotation state according to the preferred embodiment of the present invention.
Figure 6:
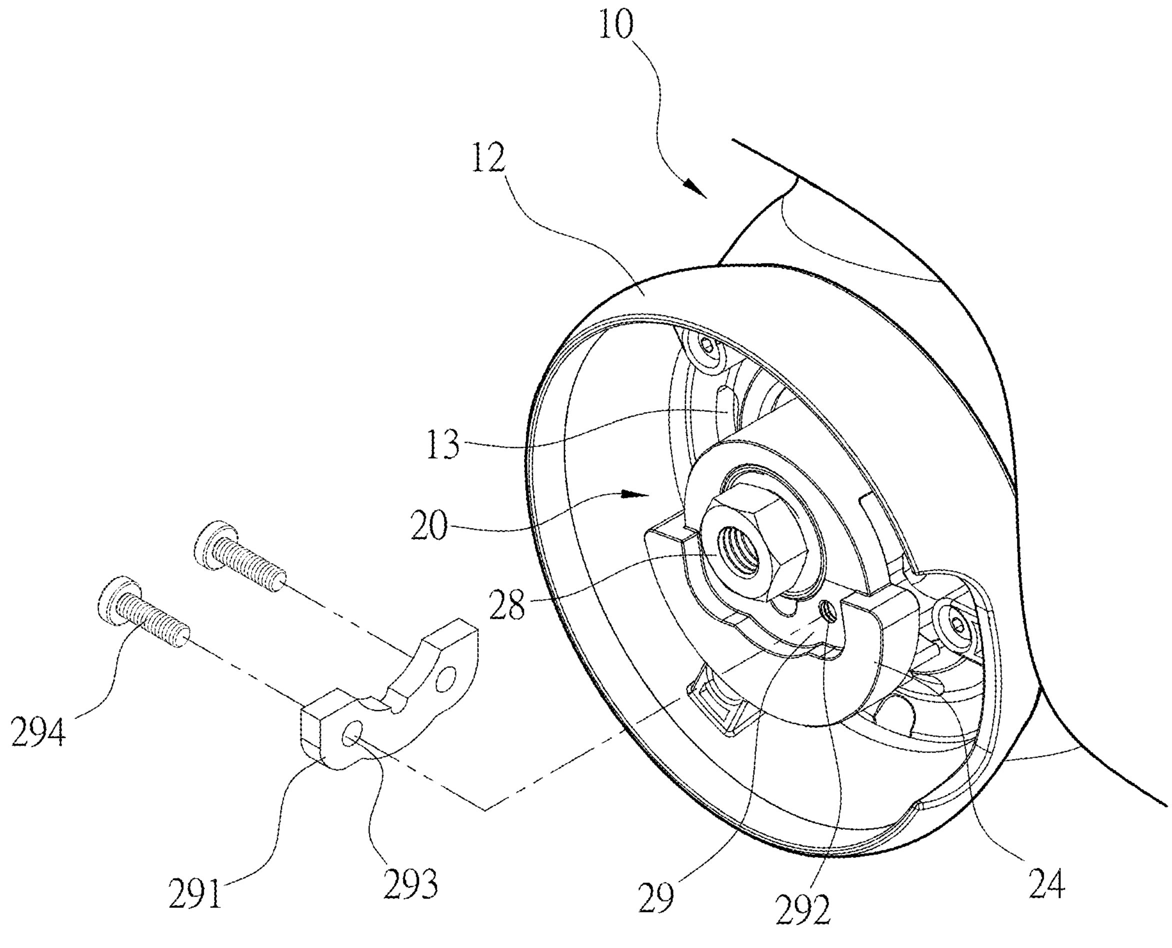
FIG. 6 is an exploded view of a smaller size of the grinding accessory equipped with a lighter counterweight block according to the preferred embodiment of the present invention.
Figure 7:
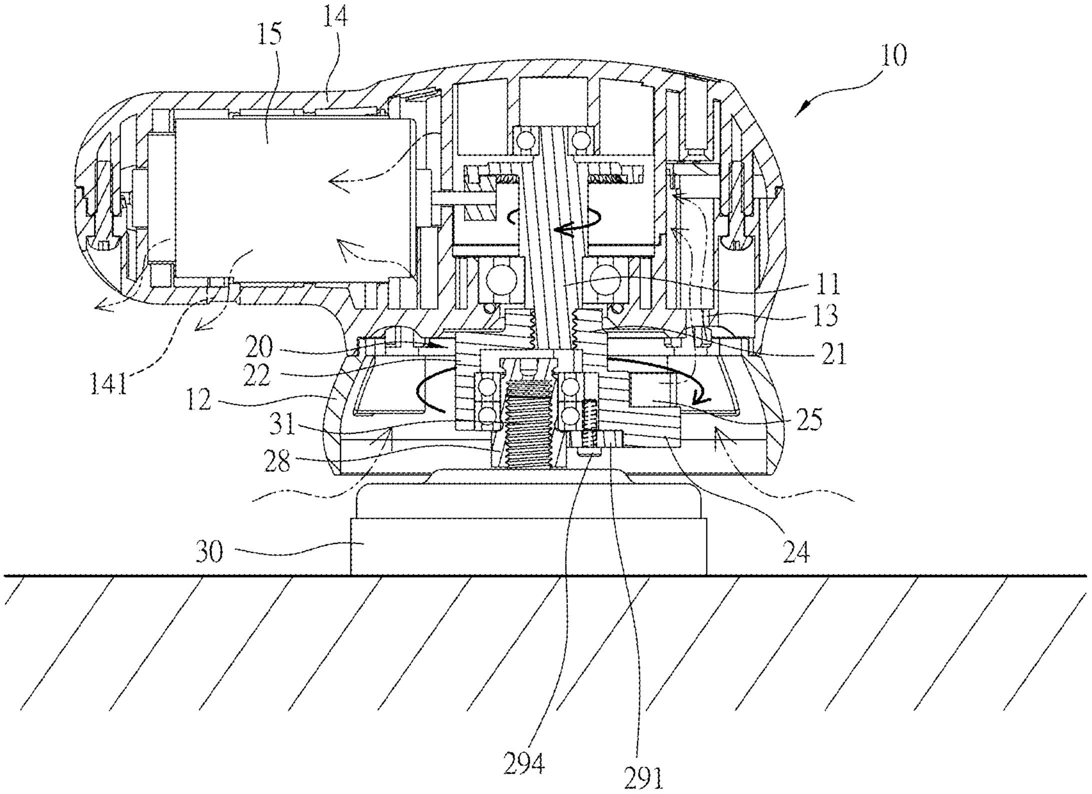
FIG. 7 is a cross-sectional view of the smaller version of the grinding accessory equipped with the lighter counterweight block according to the preferred embodiment of the present invention.
Figure 8:
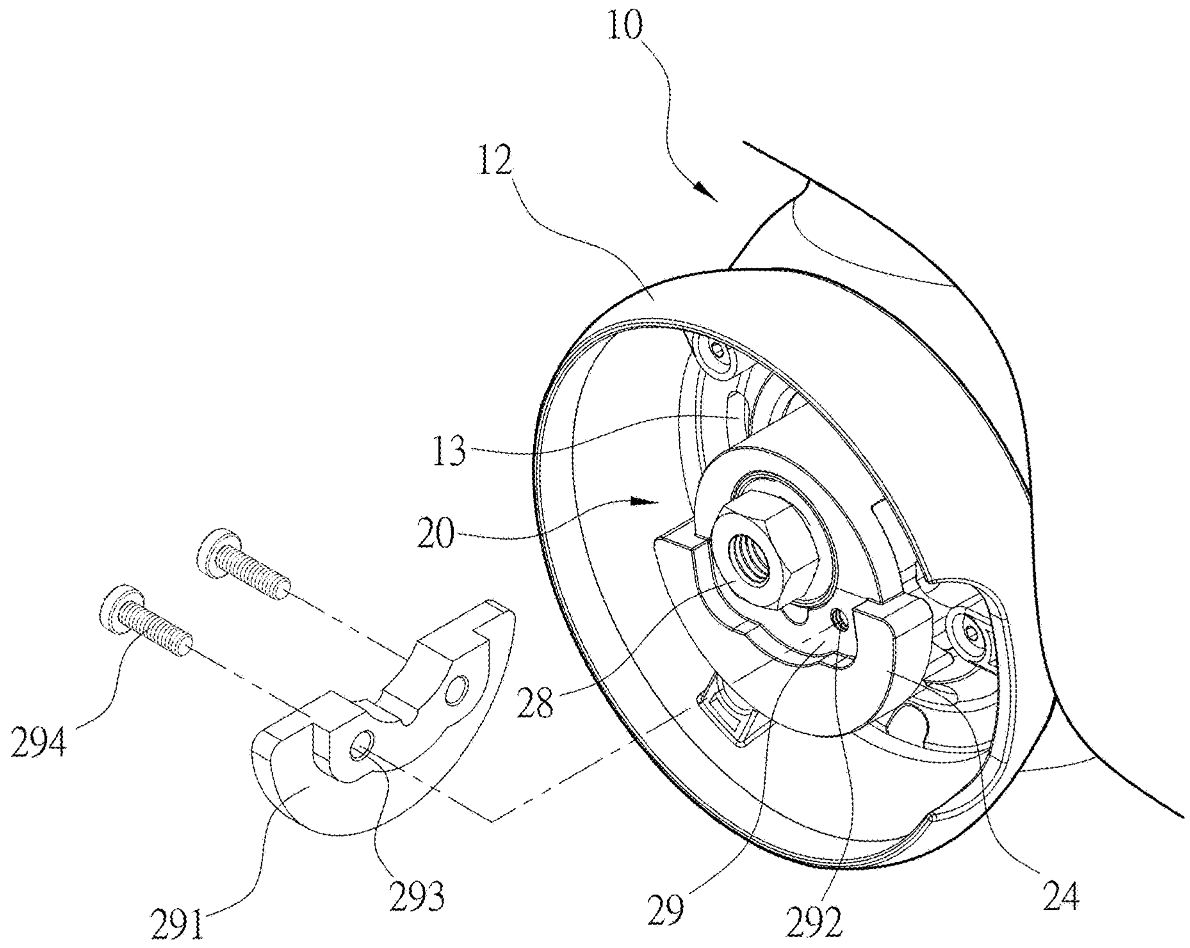
FIG. 8 is an exploded view of a larger size of the grinding accessory equipped with the heavier counterweight block according to the preferred embodiment of the present invention.
Figure 9:
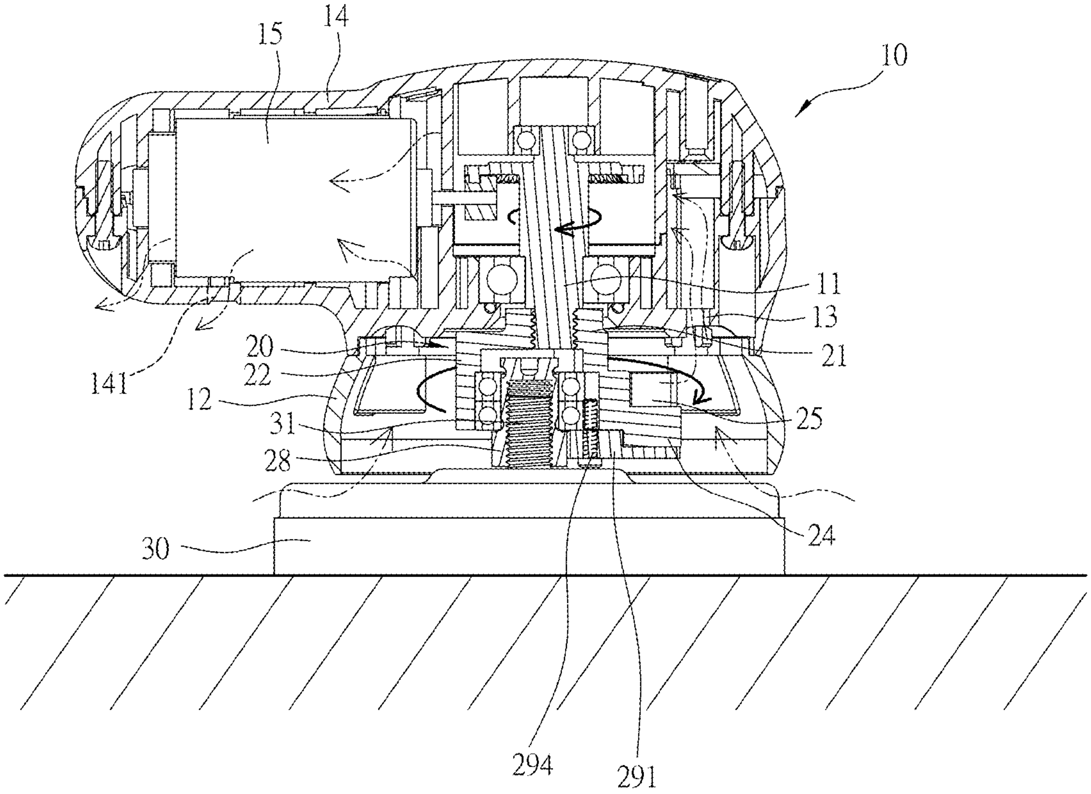
FIG. 9 is a cross-sectional view of the larger size of the grinding accessory equipped with the heavier counterweight block according to the preferred embodiment of the present invention.

In addition, when the connecting shaft 28 of the counterweight set 20 is assembled with the grinding accessory 30, since the connecting shaft 28 is closer to the first counterweight member 22, the counterweight block 291 needs to be installed at the recess 29 to achieve the counterweight balance, and the weight of the counterweight block 291 is matched with the volume size of the grinding accessory 30, thereby improving the stability of the grinding accessory 30. The counterweight block 391 is available in 5 g, 9 g and 19 g. But it is not limited thereto. The following examples demonstrate the selection of various counterweight blocks 291. First, as shown in FIGS. 2 and 5, the grinding machine 10 is equipped with the general size grinding accessory 30, the selected counterweight block 291 is 9 g and is locked onto the recess 29 via the bolt 294; as shown in FIGS. 6 and 7, a a smaller size grinding accessory 30 is installed onto the grinding machine 10, and a relatively thin counterweight block 291 with 5 g is selected and locked onto the recess 29 with the bolt 294. Finally, as shown in FIGS. 8 and 9, the grinding machine 10 is equipped with a larger size grinding accessory 30 so the counterweight block 291 with 19 g is selected and locked onto the recess 29 with the bolt 294.

With the structure of the above-mentioned specific embodiment, the following benefits can be obtained: when the counterweight set 20 of the present invention is operated by the driving shaft 11, not only the heat energy absorb by the counterweight set 20 is dissipated by the heat sink 25, the vortex wind speed and centrifugal force generated by the heat sink 20 in the ring-shaped cover 12 draw the air outside into the grinding machine 10 into the ring-shaped cover 11 to performs heat dissipation on the drive 11 and the motor 15, thereby solving the high heat problem caused by the load operation of the grinding machine.

Furthermore, the counterweight set 20 also adopts the integrated design of the heat sink 25, which can greatly reduce the volume to improve the convenience of installation and use, and the gap-free design of the one-piece heat sink 25 prevents noise and shaking during operations, further improves the safety of the grinding machine 10.

Although the present invention has been explained in relation to its preferred embodiment, it is to be understood that many other possible modifications and variations can be made without departing from the spirit and scope of invention as hereinafter claimed.

What is claimed is:

1. A heat dissipation structure for a grinding machine comprising:

a grinding machine having a driving shaft with a ring-shaped cover; a counterweight set having an axial column, a first counterweight member, a second counterweight member, a third counterweight member, and a plurality of heat sinks, the axial column further having a connecting screw hole assembled with the driving shaft, the first counterweight member provided at one side of the axial column, the second counterweight member and the third counterweight member being arc-shaped and overlapped on another side of the axial column, the second counterweight member being overlapped above the third counterweight member, the third counterweight member being larger than the second counterweight member and a height difference is formed between the second and the third counterweight members; the heat sinks are provided around the second counterweight member with heights equal to the height difference; and the counterweight set further comprises a connecting shaft for connecting to a grinding accessory.

2. The heat dissipation structure for a grinding machine as claimed in claim 1, wherein the grinding machine further comprises a plurality of guiding entrances at a bottom end, a motor box provided at one side for accepting a driving motor, and the motor box further comprises a plurality of guiding exits.

3. The heat dissipation structure for a grinding machine as claimed in claim 1, wherein the third counterweight member of the counterweight set is larger than the first counterweight member, and the first counterweight member is higher than the second and third counterweight members, such that the connecting screw hole is closer to the first counterweight member, and when the counterweight set is connected to the driving shaft for rotation, the counterweight set produces an eccentric rotation stroke relative to the grinding machine.

4. The heat dissipation structure for a grinding machine as claimed in claim 1, wherein a bottom end of the counterweight set has an assembly space facing the first counterweight member, the assembly space accepts two bearing members, a center of each bearing member and the connecting screw hole are non-concentrically arranged and are connected to the connecting shaft, the connecting shaft further comprising a shaft aperture, and the grinding accessory further comprises a center screw assembled with the shaft aperture.

5. The heat dissipation structure for a grinding machine as claimed in claim 4, wherein the bottom end of the counterweight set further comprises a recess between the third counterweight member and the assembly space, the recess correspondingly has at least one counterweight block pair with the grinding accessories.

6. The heat dissipation structure for a grinding machine as claimed in claim 5, wherein the recess has at least two threaded apertures, the counterweight block has at least two through apertures aligned with the two threaded apertures, and two bolts are employed to lock the counterweight block onto the recess.

7. The heat dissipation structure for a grinding machine as claimed in claim 1, wherein the second counterweight member and the third counterweight member are both semi-circular arc shapes.

* * * * *